United States Patent
Yoneoka et al.

(10) Patent No.: US 9,075,079 B2
(45) Date of Patent: Jul. 7, 2015

(54) METHOD AND STRUCTURE OF AN INTEGRATED MEMS INERTIAL SENSOR DEVICE USING ELECTROSTATIC QUADRATURE-CANCELLATION

(71) Applicant: mCube Inc., San Jose, CA (US)

(72) Inventors: Shingo Yoneoka, San Jose, CA (US); Sudheer Sridharamurthy, Menlo Park, CA (US); Wenhua Zhang, San Jose, CA (US); Te-Hsi Terrence Lee, San Jose, CA (US)

(73) Assignee: MCUBE INC., San Jose, CA (US)

( * ) Notice: Subject to any disclaimer, the term of this patent is extended or adjusted under 35 U.S.C. 154(b) by 0 days.

(21) Appl. No.: 14/297,337

(22) Filed: Jun. 5, 2014

(65) Prior Publication Data

US 2014/0361348 A1  Dec. 11, 2014

Related U.S. Application Data

(60) Provisional application No. 61/832,657, filed on Jun. 7, 2013.

(51) Int. Cl.
| | | |
|---|---|---|
| *G01P 15/13* | (2006.01) | |
| *G01C 19/5762* | (2012.01) | |
| *G01C 19/5719* | (2012.01) | |
| *G01P 15/125* | (2006.01) | |
| *G01P 15/08* | (2006.01) | |
| *G01C 19/5712* | (2012.01) | |

(52) U.S. Cl.
CPC .......... *G01P 15/131* (2013.01); *G01C 19/5762* (2013.01); *G01C 19/5712* (2013.01); *G01C 19/5719* (2013.01); *G01P 15/125* (2013.01); *G01P 15/0802* (2013.01); *G01P 2015/084* (2013.01); *G01P 2015/0865* (2013.01)

(58) Field of Classification Search
CPC .......... G01C 19/5719; G01C 19/5712; G01C 19/5762; G01P 15/131; G01P 15/125; G01P 15/0802; G01P 2015/084; G01P 2015/0865; G01P 2015/0862; G01L 9/0042; G01L 9/0048; G01L 9/005; G01L 9/0051; G01L 9/0052; G01L 9/0053; G01L 9/0054; G01L 9/0055; G01L 9/006; G01L 9/0073
See application file for complete search history.

(56) References Cited

U.S. PATENT DOCUMENTS

2003/0196490 A1  10/2003  Cardarelli
2009/0309203 A1  12/2009  Seppala et al.

(Continued)

OTHER PUBLICATIONS

Search Report for European patent application EP14171673.8 (Nov. 10, 2014), 8 pages.

(Continued)

*Primary Examiner* — Yasser A Abdelaziez
*Assistant Examiner* — Farun Lu
(74) *Attorney, Agent, or Firm* — Kilpatrick Townsend & Stockton LLP (57) ABSTRACT

An integrated MEMS inertial sensor device. The device includes a MEMS inertial sensor overlying a CMOS substrate. The MEMS inertial sensor includes a drive frame coupled to the surface region via at least one drive spring, a sense mass coupled to the drive frame via at least a sense spring, and a sense electrode disposed underlying the sense mass. The device also includes at least one pair of quadrature cancellation electrodes disposed within a vicinity of the sense electrode, wherein each pair includes an N-electrode and a P-electrode.

20 Claims, 5 Drawing Sheets

(56) References Cited

U.S. PATENT DOCUMENTS

2010/0071467 A1* 3/2010 Nasiri et al. ............... 73/504.12
2011/0030473 A1 2/2011 Acar
2011/0031565 A1 2/2011 Marx et al.
2011/0291644 A1* 12/2011 Kanemoto ................... 324/162
2012/0012970 A1 1/2012 Xu et al.
2012/0223726 A1 9/2012 Zhang et al.
2013/0247666 A1 9/2013 Acar
2013/0328139 A1 12/2013 Acar

OTHER PUBLICATIONS

Search Report and Written Opinion for European patent application EP14152747 (Sep. 3, 2014), 11 pages.

Sun Sensing and control electronics design for capacitive CMOS-MEMS inertial sensors, PhD. Dissertation University of Florida (copyright 2002), sections 2.2.4, 7.3, chapters 3 and 6.

Tatar et al. "Quadrature-Error Compensation and Corresponding Effects on the Performance of Fully Decoupled MEMS Gyroscopes," Journal of Microelectromechanical Systems, vol. 21, pp. 656-667 (Jun. 2012).

Xie "Gyroscope and Micromirror Design Using Vertical Axis CMOS-MEMS Actuation and Sensing," PhD. Dissertation Carnegie Institute of Technology (copyright 2002), sections 3.2, 5.3.2.2, 6.2.8, chapter 6.

* cited by examiner

METHOD AND STRUCTURE OF AN INTEGRATED MEMS INERTIAL SENSOR DEVICE USING ELECTROSTATIC QUADRATURE-CANCELLATION

CROSS-REFERENCES TO RELATED APPLICATIONS

The present application claims priority to and incorporates by reference, for all purposes, the following provisional application: U.S. Provisional App. 61/832,657, filed Jun. 7, 2013. The present application also incorporates by reference, for all purposes, the following pending patent applications: Ser. No. 13/788,503, filed Mar. 7, 2013.

BACKGROUND OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention provides an integrated MEMS inertial sensor device. The device includes a MEMS inertial sensor overlying a CMOS substrate having at least one CMOS IC device. The MEMS inertial sensor includes a drive frame coupled to the surface region via at least one drive spring, a sense mass coupled to the drive frame via at least a sense spring, and a sense electrode disposed underlying the sense mass. The device also includes at least one pair of quadrature cancellation electrodes disposed within a vicinity of the sense electrode, wherein each pair includes an N-electrode and a P-electrode. In a specific embodiment, the at least one pair of quadrature cancellation electrodes is configured such that the torques caused by the N-electrode and the P-electrode are the same when the same electrical potential is applied to them. The at least one CMOS IC device includes a drive circuit configured to provide a drive signal to the at least one pair of quadrature cancellation electrodes, the drive circuit including at least one phase shifter and at least one gain controller. The drive signal can be provided by a DC and AC signal, or only a DC signal.

In an embodiment, the present invention provides an method for fabricating an integrated MEMS inertial sensor device. The method can include providing a substrate member having a surface region, forming a CMOS layer with a CMOS surface region overlying the surface region, and forming a MEMS inertial sensor overlying the CMOS surface region. Forming the MEMS inertial sensor can include forming a drive frame coupled to the surface region via at least one drive spring, forming a sense mass coupled to the drive frame via at least a sense spring, and forming a sense electrode disposed underlying the sense mass. The method also includes forming at least one pair of quadrature cancellation electrodes disposed within a vicinity of the sense electrode, wherein each pair includes an N-electrode and a P-electrode. In a specific embodiment, the at least one pair of quadrature cancellation electrodes is configured such that the torques caused by the N-electrode and the P-electrode are the same when the same electrical potential is applied to them. Forming the CMOS layer can include forming at least one CMOS IC device, which can include a drive circuit configured to provide a drive signal to the at least one pair of quadrature cancellation electrodes. The drive circuit can include at least one phase shifter and at least one gain controller. The drive signal can be provided by a DC and AC signal, or only a DC signal.

Many benefits are achieved by way of embodiments of the present invention over conventional techniques. For example, embodiments of the present invention provide an integrated MEMS inertial sensor device having an architecture that implements an electrode design used to cancel quadrature error in the mechanical domain using AC or DC signals. The present invention also provides the benefit (especially for the cancellation using the DC signal) of a reduction of CMOS area, since the proposed quadrature-error cancellation method can remove phase shifter and quad DAC (variable capacitance) elements. Additionally, the method provides a process and system that are compatible with conventional semiconductor and MEMS process technologies without substantial modifications to conventional equipment and processes. Depending upon the embodiment, one or more of these benefits may be achieved. These and other benefits will be described in more detail throughout the present specification and more particularly below.

Various additional objects, features, and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to MEMS (Micro-Electro-Mechanical-Systems). More specifically, embodiments of the invention provide methods and structures for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Figure 1:
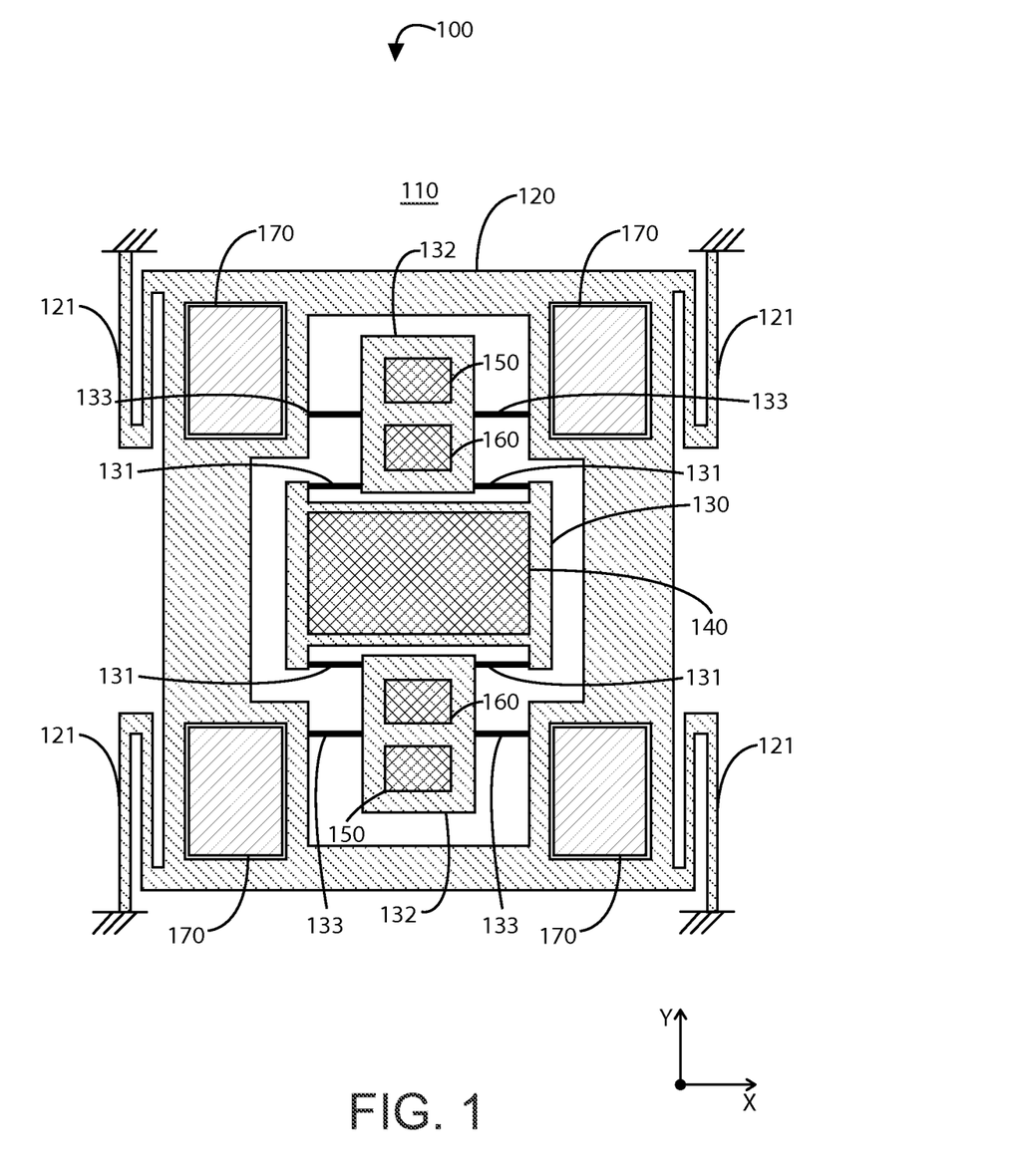
FIG. 1 is a simplified diagram illustrating a top view of an integrated vibratory gyroscope sensor device according to an embodiment of the present invention.

FIG. 1 is a simplified diagram illustrating a top view of an integrated vibratory gyroscope sensor device according to an embodiment of the present invention. As shown, the device 100 can be provided overlying the surface region of a CMOS substrate 110. The sensor device 100 can include a drive frame 120 coupled to the surface region via at least one drive spring 121, a sense mass 130 coupled to the drive frame 120 via at least a sense spring 131, and a sense electrode 140 disposed underlying the sense mass 130, and at least one pair of quadrature cancellation electrodes 150, 160 disposed within a vicinity of the sense electrode, wherein each pair includes an N-electrode 150 and a P-electrode 160. In an embodiment, the device 100 can include at least one drive comb 170 or at least one drive feedback comb 170 being configured to the drive frame 120 and the substrate 110.

In a specific embodiment, the sense mass 130 can include a central sense mass 130 coupled to two peripheral sensor masses 132 by central sense springs 131. As shown in FIG. 1, the peripheral sense masses 132 are configured above the quadrature cancellation electrodes 150 and 160, while the central sense mass 130 is configured above the sense electrode 140. Here, the entire sense mass structure is coupled to the drive frame 120 by peripheral sense springs 133 coupled to the peripheral sense masses 132. Further details regarding the movement of the sense mass are described with respect to FIGS. 2A-C.

In an embodiment, the integrated vibratory gyroscope sensor device is configured with electrostatic quadrature-error cancellation using an AC signal. During operation, the drive frame oscillates at a certain amplitude along the X-axis. Once an angular velocity is applied in the Y-axis, the Coriolis force moves the sense mass in the Z-direction. The motion of the sense mass is detected by a change in capacitance between the sense mass and one or more sense electrodes.

The drive motion can be mechanically or electrically coupled to the sense motion. This coupling contributes to an effect called quadrature error. This error typically has a 90 degree phase difference between the Coriolis signals. Since the quadrature error is typically several orders of magnitude larger than the sense motion by the Coriolis force, it is necessary to cancel the quadrature error to prevent saturation of the electrical circuitry that is designed to detect the sense motion by the Coriolis force.

The motion of the sense mass caused by the quadrature can be expressed as:

$$z_{quad} = A \sin(\omega t)$$

where $\omega$ is the drive resonant frequency. Therefore, the quadrature signal can be cancelled if we can superimpose the same motion with anti-phase. As shown in FIG. 1, embodiments of the present invention uses electrostatic forces generated by quadrature cancellation electrodes P and N to substantially eliminate the quadrature error.

Figure 2A:
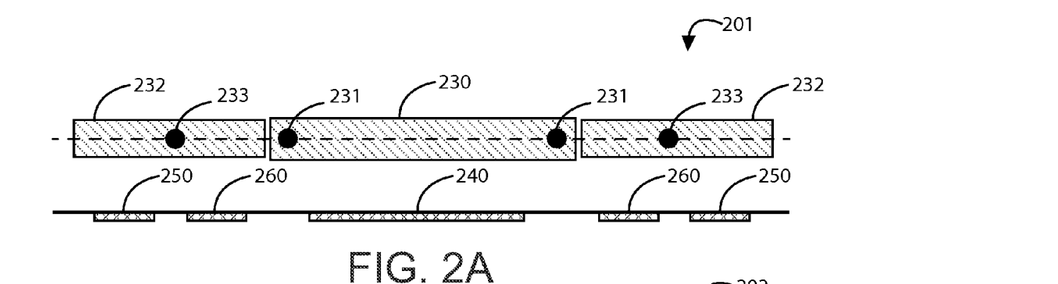
FIGS. 2A-2C are simplified diagrams illustrating cross-sectional views of an integrated vibratory gyroscope sensor device during operation according an embodiment of the present invention.
Figure 2B:
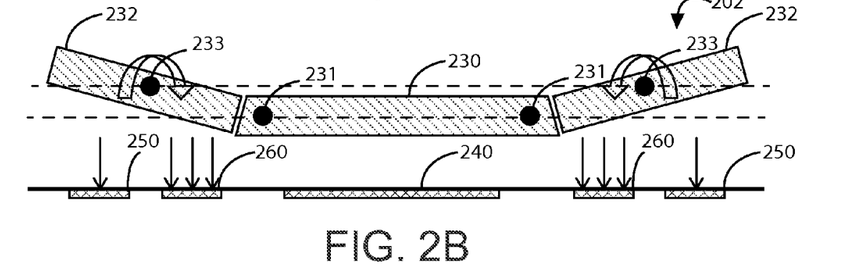
Figure 2C:
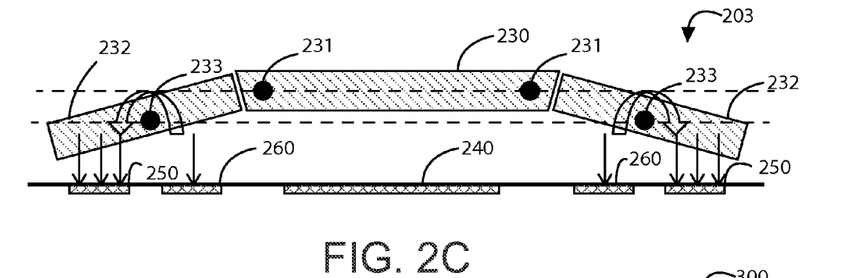

FIG. 2A-2C are simplified diagrams illustrating cross-sectional views of an integrated vibratory gyroscope sensor device during operation according an embodiment of the present invention. These figures provide cross-sectional views to show how the electrostatic forces by the cancellation electrode control the motion of the sense mass in the device of FIG. 1. These figures show the central sense mass 230 with central sense springs 231 configured overlying a sense electrode 240 and two peripheral sense masses 232 with peripheral sense springs 233 configured overlying the two pairs of quadrature cancellation electrodes, each with an N-electrode 250 and a P-electrode 260.

FIG. 2A shows the sense mass in a stationary position. If there is a mechanical quadrature error, the Z-axis position of the drive frame can be changed as the drive frame oscillates, which can also change the Z-axis position of the sense mass. This Z-axis motion of the sense mass can be corrected by electrostatic forces as shown in the following FIGS. 2B and 2C. The quadrature cancellation electrodes P and N can provide electrostatic forces (represented by the arrows representing force above the electrodes) to counteract the quadrature error whether the sense mass moves in the −Z direction (FIG. 2B) or the +Z direction (FIG. 2C).

Figure 3:
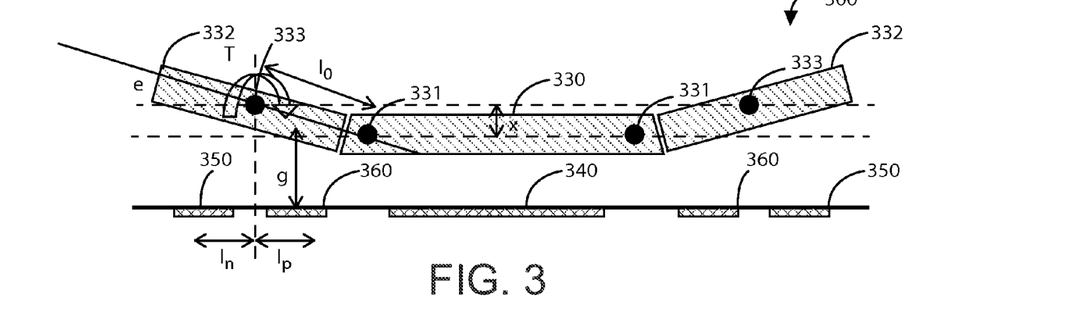
FIG. 3 is a simplified diagram illustrating a cross-sectional view of an integrated vibratory gyroscope sensor device during operation according an embodiment of the present invention.

FIG. 3 is a simplified diagram illustrating a cross-sectional view of an integrated vibratory gyroscope sensor device during operation according an embodiment of the present invention. This figure shows the central sense mass 330 with central sense springs 331 configured overlying a sense electrode 340 and two peripheral sense masses 332 with peripheral sense springs 333 configured overlying the two pairs of quadrature cancellation electrodes, each with an N-electrode 350 and a P-electrode 360. As shown, the Z-axis displacement of the sense mass is proportional to the rotational angle of the torsion springs or the torque applied to the torsion springs:

$$z_{cancel} \propto \theta \propto T$$

When the sense mass, the quadrature cancellation electrode P, and the quadrature cancellation electrode N are connected to $V_{pm}$, $V_{pm}+V_{DC}+V_{ac}\sin(\omega t)$, and $V_{pm}+V_{DC}-V_{ac}\sin(\omega t)$, respectively, the displacement of the sense mass can be described as:

$$z_{cancel} \propto \frac{\epsilon A}{g^2}(V_{DC}V_{AC}\sin(\omega t)) \propto B\sin(\omega t)$$

(Note: "A" in this equation is the area of the sense electrode, which is different from the "A" in the equation described previously for FIG. 1). Here, it is assumed that the torques caused by the positive and negative electrodes are the same when the area and the distance from the torsion springs are the same. In a specific embodiment, the area and location of the positive and negative electrodes can be carefully designed such that the generated torques are the same when the electrical potentials are the same. Using this configuration, the quadrature error can be substantially cancelled with the controlling electrical signals $V_{DC}$ and $V_{AC}$.

Figure 4:
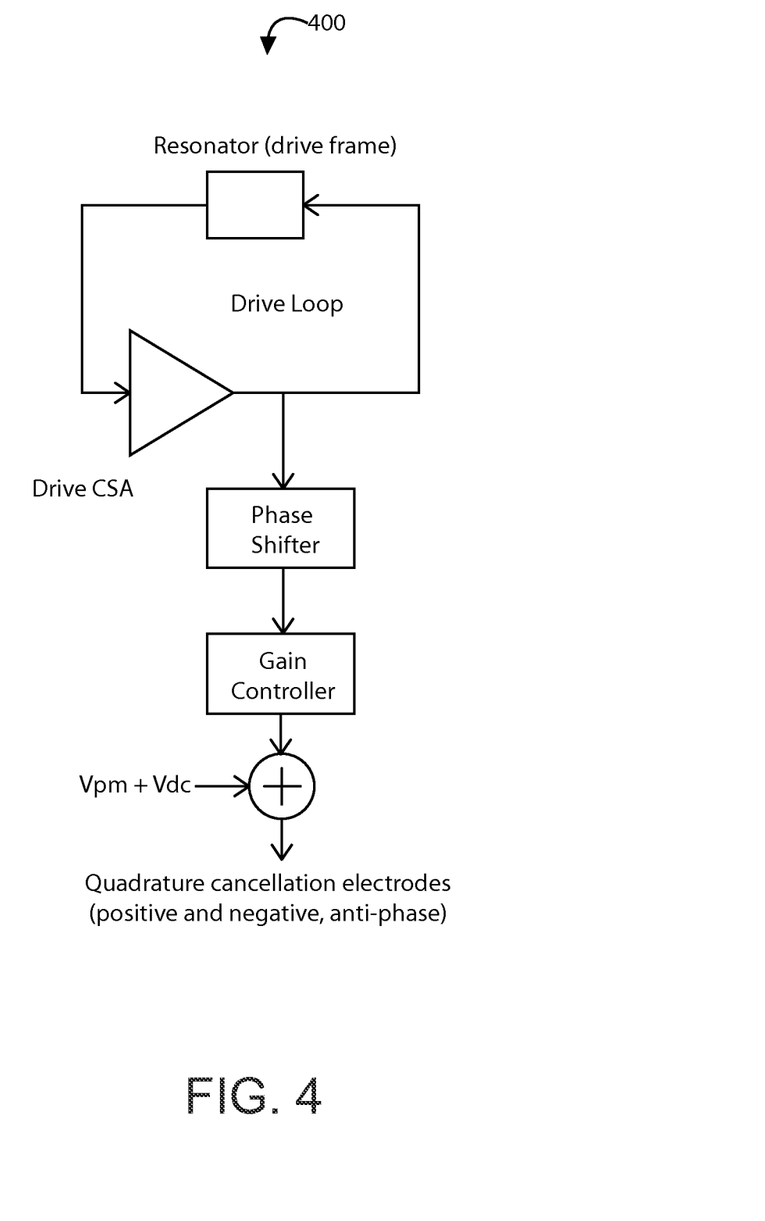
FIG. 4 is a simplified block diagram of an integrated vibratory gyroscope sensor device according to an embodiment of the present invention.

FIG. 4 is a simplified block diagram of an integrated vibratory gyroscope sensor device according to an embodiment of the present invention. This block diagram 400 represents a circuit diagram implementing the quadrature cancellation. As shown, a drive loop with a resonator and a drive CSA (Charge Sense Amplifier) is coupled in series to a phase shifter, a gain controller, a voltage source, and the quadrature cancellation electrodes. In an embodiment, each line has a differential signal and the voltage source can include the combined input of a Vdc signal and a Vpm signal. The output signal "drive CSA" can be used for the quadrature cancellation signal after modifying its amplitude and phase. When there are multiple drive frames (or differential designs), multiple phase shifters and gain controllers can be implemented.

Figure 5:
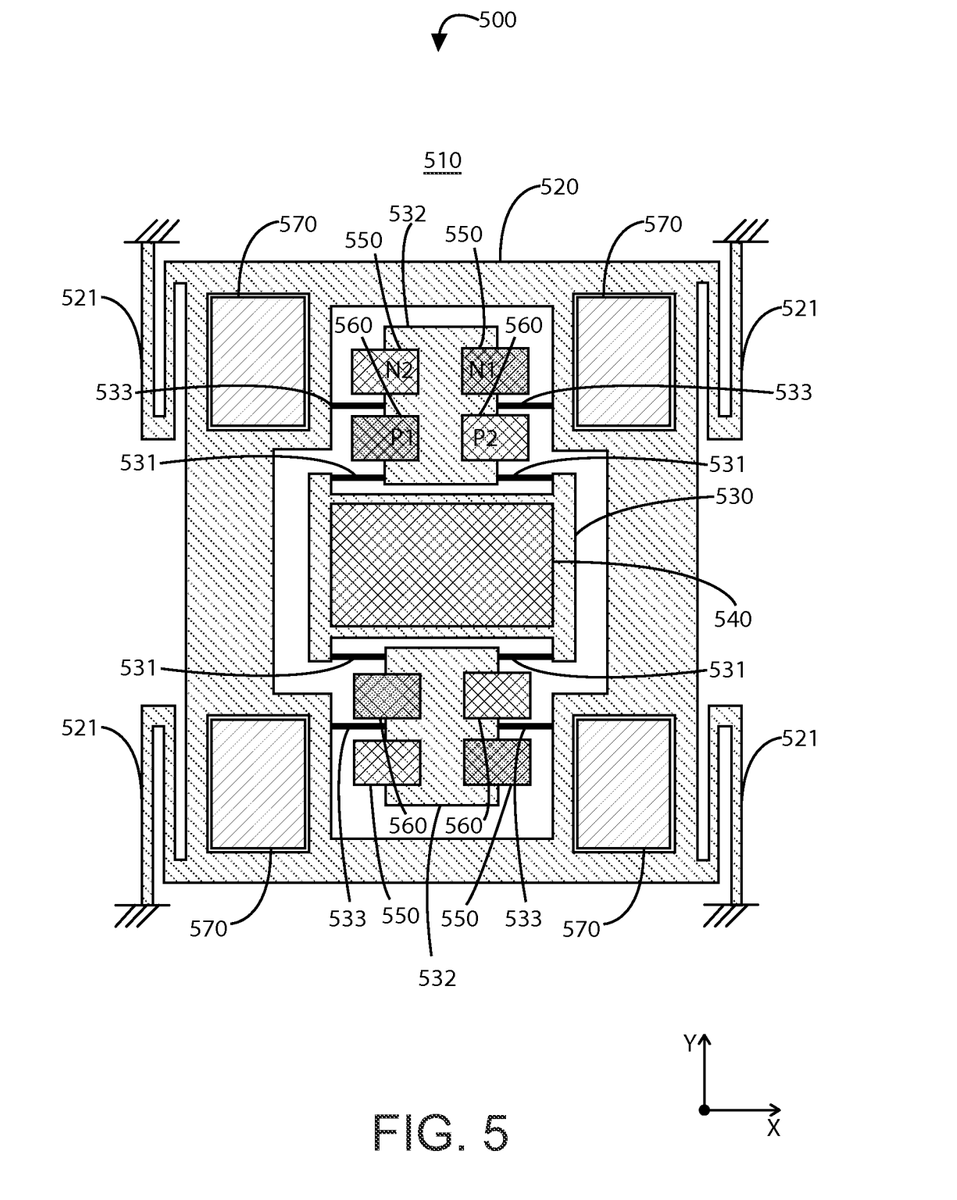
FIG. 5 is a simplified diagram illustrating a top view of an integrated vibratory gyroscope sensor device according to an embodiment of the present invention.

FIG. 5 is a simplified diagram illustrating a top view of an integrated vibratory gyroscope sensor device according to an embodiment of the present invention. As shown, the device 500 can be provided overlying the surface region of a CMOS substrate 510. The sensor device 500 can include a drive frame 520 coupled to the surface region via at least one drive spring 521, a sense mass 530 coupled to the drive frame 520 via at least a sense spring 531, and a sense electrode 540 disposed underlying the sense mass 130, and at least one pair of quadrature cancellation electrodes 550, 560 disposed within a vicinity of the sense electrode. Here, two pairs of electrodes, each pair including an N-electrode 550 and a P-electrode 560, are provided in an alternative pattern on each side of the sense electrode 530. In an embodiment, the device 500 can include at least one drive comb 570 or at least one drive feedback comb 570 being configured to the drive frame 520 and the substrate 510.

In a specific embodiment, the sense mass 530 can include a central sense mass 530 coupled to two peripheral sensor masses 532 by central sense springs 531. As shown in FIG. 5, the peripheral sense masses 532 are configured above the two pairs of quadrature cancellation electrodes 150 and 160 on each side of the central sense mass 530, while the central sense mass 530 is configured above the sense electrode 540. Here, the entire sense mass structure is coupled to the drive frame 520 by peripheral sense springs 533 coupled to the peripheral sense masses 532. Further details are provided with respect to FIGS. 6A-C.

In a specific embodiment, the integrated vibratory gyroscope sensor device is configured with electrostatic quadrature-error cancellation using a DC signal. In this configuration, only the DC signal is used to cancel the quadrature error. Either the set of quadrature cancellation P1/N1 or P2/N2 is used based on the polarity of the quadrature error.

Figure 6A:
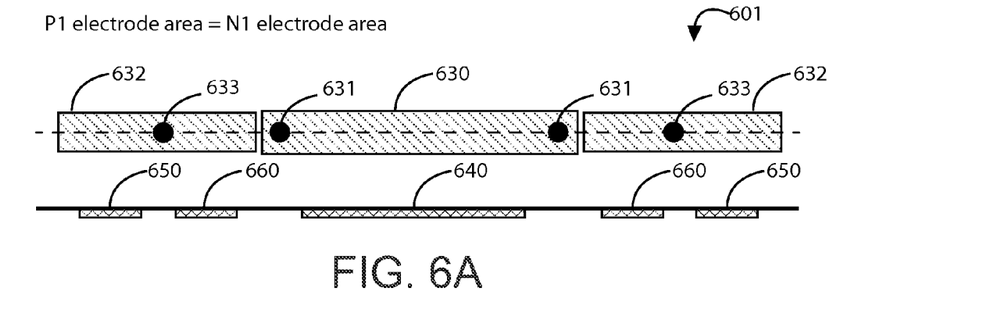
FIG. 6A-6C are simplified diagrams illustrating cross-sectional views of an integrated vibratory gyroscope sensor device during operation according an embodiment of the present invention.
Figure 6B:
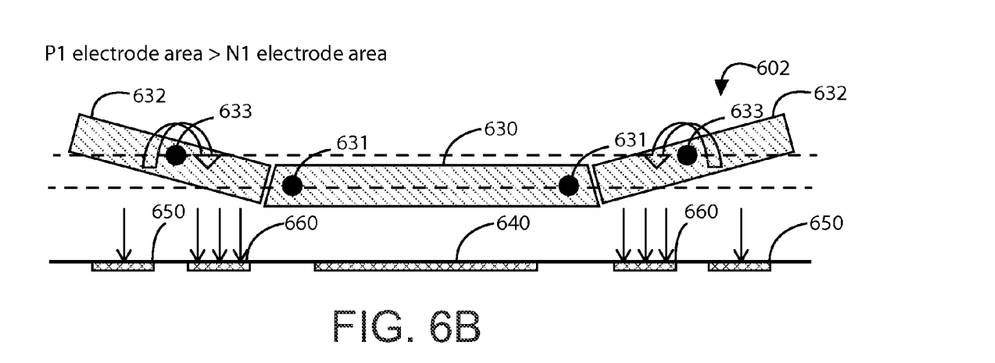
Figure 6C:
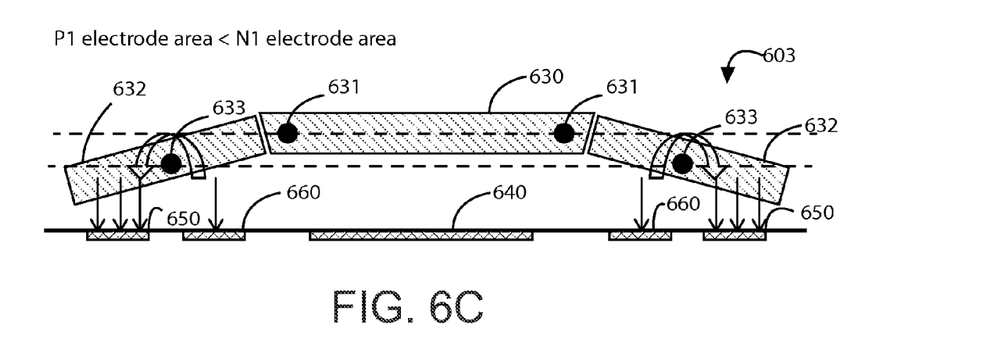

FIG. 6A-6C are simplified diagrams illustrating cross-sectional views of an integrated vibratory gyroscope sensor device during operation according an embodiment of the present invention. These figures represent operation of the device as shown in FIG. 5. These figures show the central sense mass 630 with central sense springs 631 configured overlying a sense electrode 640 and two peripheral sense masses 632 with peripheral sense springs 633 configured overlying the two pairs of quadrature cancellation electrodes, each with an N-electrode 650 and a P-electrode 660.

Assuming that the sense mass and one of the quadrature cancellation electrodes are connected to the DC voltage $V_{pm}$ and $V_{DC}$, the operation is as follows. When the drive frame oscillates with $X_0 \sin(\omega t)$, the overlapped area between the MEMS structure and the quadrature cancellation electrodes is changed as $w \times (l_0+X_0 \sin(\omega t))$ or $w \times (l_0-X_0 \sin(\omega t))$, where w and $l_0$ are the width and initial overlapped length of the quadrature cancellation electrode. Therefore, the total toque applied to the torsion beam is:

$$T \propto \frac{\epsilon w}{g^2}(V_{pm} - V_{DC})^2 X_0 \sin(\omega t)$$

Since the displacement of the sense mass is proportional to the torque, $$z_{cancel} \propto \frac{\epsilon w}{g^2}(V_{pm} - V_{DC})^2 X_0 \sin(\omega t)$$

With controlling $V_{DC}$ and matching $z_{cancel}$ and $z_{quad}$, the quadrature error can be substantially canceled. Compared to the configuration of FIGS. 1-3, the circuit for this embodiment can be simpler since it only requires the switch for the polarity and for $V_{DC}$.

In a specific embodiment, the integrated vibratory gyroscope sensor device is designed with an architecture that implements an electrode design used to cancel quadrature error in the mechanical domain using AC or DC signals. One of the benefits of the present invention (especially for the cancellation using the DC signal) is a reduction of CMOS area, since the proposed quadrature-error cancellation method can remove phase shifter and quad DAC (variable capacitance) elements.

In an embodiment, the present invention provides an integrated MEMS inertial sensor device. The device includes a MEMS inertial sensor overlying a CMOS substrate having at least one CMOS IC device. The MEMS inertial sensor includes a drive frame coupled to the surface region via at least one drive spring, a sense mass coupled to the drive frame via at least a sense spring, and a sense electrode disposed underlying the sense mass. The device also includes at least one pair of quadrature cancellation electrodes disposed within a vicinity of the sense electrode, wherein each pair includes an N-electrode and a P-electrode. In a specific embodiment, the at least one pair of quadrature cancellation electrodes is configured such that the torques caused by the N-electrode and the P-electrode are the same when the same electrical potential is applied to them. The at least one CMOS IC device includes a drive circuit configured to provide a drive signal to the at least one pair of quadrature cancellation electrodes, the drive circuit including at least one phase shifter and at least one gain controller. The drive signal can be provided by a DC and AC signal, or only a DC signal.

In an embodiment, the present invention provides an method for fabricating an integrated MEMS inertial sensor device. The method can include providing a substrate member having a surface region, forming a CMOS layer with a CMOS surface region overlying the surface region, and forming a MEMS inertial sensor overlying the CMOS surface region. Forming the MEMS inertial sensor can include forming a drive frame coupled to the surface region via at least one drive spring, forming a sense mass coupled to the drive frame via at least a sense spring, and forming a sense electrode disposed underlying the sense mass. The method also includes forming at least one pair of quadrature cancellation electrodes disposed within a vicinity of the sense electrode, wherein each pair includes an N-electrode and a P-electrode. In a specific embodiment, the at least one pair of quadrature cancellation electrodes is configured such that the torques caused by the N-electrode and the P-electrode are the same when the same electrical potential is applied to them. Forming the CMOS layer can include forming at least one CMOS IC device, which can include a drive circuit configured to provide a drive signal to the at least one pair of quadrature cancellation electrodes. The drive circuit can include at least one phase shifter and at least one gain controller. The drive signal can be provided by a DC and AC signal, or only a DC signal.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated MEMS inertial sensor device, the device comprising:
    a CMOS substrate having a surface region, the CMOS substrate having at least one CMOS IC device;
    a MEMS inertial sensor overlying the surface region, the MEMS inertial sensor comprising;
    a drive frame coupled to the surface region via at least one drive spring,
    a sense mass coupled to the drive frame via at least a sense spring, and
    a sense electrode disposed underlying the sense mass; and
    at least one pair of quadrature cancellation electrodes disposed within a vicinity of the sense electrode, wherein each pair includes an N-electrode and a P-electrode.

2. The device of claim 1 wherein the MEMS inertial sensor includes at least one drive comb or at least one drive feedback comb being configured to the drive frame and the CMOS substrate.

3. The device of claim 1 wherein the at least one pair of quadrature cancellation electrodes is configured such that the torques caused by the N-electrode and the P-electrode are the same when the same electrical potential is applied to them.

4. The device of claim 1 wherein the at least one CMOS IC device includes a drive circuit configured to provide a drive signal to the at least one pair of quadrature cancellation electrodes, the drive circuit including at least one phase shifter and at least one gain controller.

5. The device of claim 4 wherein the drive signal comprises a DC signal and an AC signal.

6. The device of claim 4 wherein the drive signal consists of a DC signal.

7. The device of claim 1 further comprising a pair of peripheral sense masses, each coupled to the sense mass by at least a sense spring.

8. An integrated MEMS inertial sensor device, the device comprising:
    a substrate member having a surface region;
    a CMOS IC layer overlying the surface region, the CMOS IC layer having a CMOS surface region and at least one CMOS IC device;
    a MEMS inertial sensor overlying the CMOS surface region, the MEMS inertial sensor comprising;
    a drive frame coupled to the CMOS surface region via at least one drive spring,
    a sense mass coupled to the drive frame via at least one sense spring, and
    a sense electrode disposed underlying the sense mass; and
    at least one pair of quadrature cancellation electrodes disposed underlying the sense mass, the at least pair of quadrature cancellation electrodes having at least one quadrature cancellation N-electrode and at least one quadrature cancellation P-electrode.

9. The device of claim 8 wherein the MEMS inertial sensor includes at least one drive comb or at least one drive feedback comb being configured to the drive frame and the CMOS substrate.

10. The device of claim 8 wherein the at least one pair of quadrature cancellation electrodes is configured such that the torques caused by the N-electrode and the P-electrode are the same when the area and the distance from the sense springs are the same.

11. The device of claim 8 wherein the at least one CMOS IC device includes a drive circuit configured to provide a drive signal to the at least one pair of quadrature cancellation electrodes, the drive circuit including at least one phase shifter and at least one gain controller.

12. The device of claim 11 wherein the drive signal comprises a DC signal and an AC signal.

13. The device of claim 11 wherein the drive signal consists of a DC signal.

14. The device of claim 8 further comprising a pair of peripheral sense masses, each coupled to the sense mass by at least a sense spring.

15. An integrated MEMS inertial sensor device, the device comprising:
- a substrate member having a surface region;
- a CMOS IC layer overlying the surface region, the CMOS IC layer having a CMOS surface region and at least one CMOS IC device;
- a MEMS inertial sensor overlying the CMOS surface region, the MEMS inertial sensor comprising;
- a drive frame coupled to the CMOS surface region via four drive springs,
- a pair of peripheral sense masses, each coupled to the drive frame via a pair of peripheral springs;
- a central sense mass coupled to the pair of peripheral sense masses, each of the peripheral sense masses coupled to the central sense mass by a pair of central springs;
- a sense electrode disposed underlying the sense mass; and
- at least one pair of quadrature cancellation electrodes disposed underlying each of the peripheral sense masses, each pair of quadrature cancellation electrodes having at least one quadrature cancellation N-electrode and at least one quadrature cancellation P-electrode.

16. The device of claim 15 wherein the MEMS inertial sensor includes at least one drive comb or at least one drive feedback comb being configured to the drive frame and the CMOS substrate.

17. The device of claim 15 wherein each pair of quadrature cancellation electrodes is configured such that the torques caused by the N-electrode and the P-electrode are the same when the area and the distance from the sense springs are the same.

18. The device of claim 15 wherein the at least one CMOS IC device includes a drive circuit configured to provide a drive signal to quadrature cancellation electrodes, the drive circuit including at least one phase shifter and at least one gain controller.

19. The device of claim 15 wherein the drive signal comprises a DC signal and an AC signal.

20. The device of claim 15 wherein the drive signal consists of a DC signal.

* * * * *